Aug. 17, 1954     A. DA SILVA COSTA     2,686,567
JET CONTROLLER FOR REACTION-DRIVEN HELICOPTER ROTORS
Filed Aug. 9, 1951     4 Sheets-Sheet 1
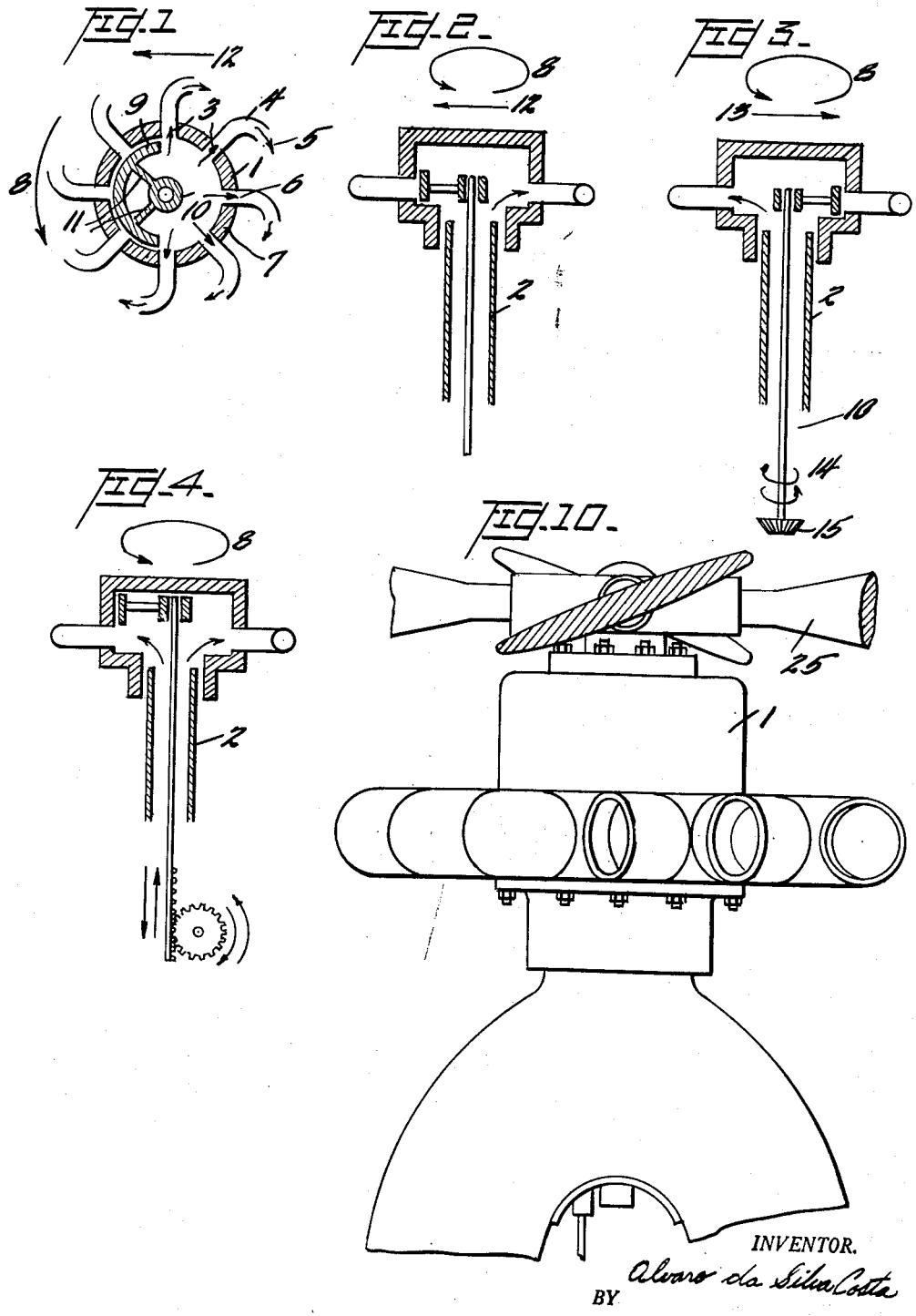
INVENTOR.
Alvaro da Silva Costa

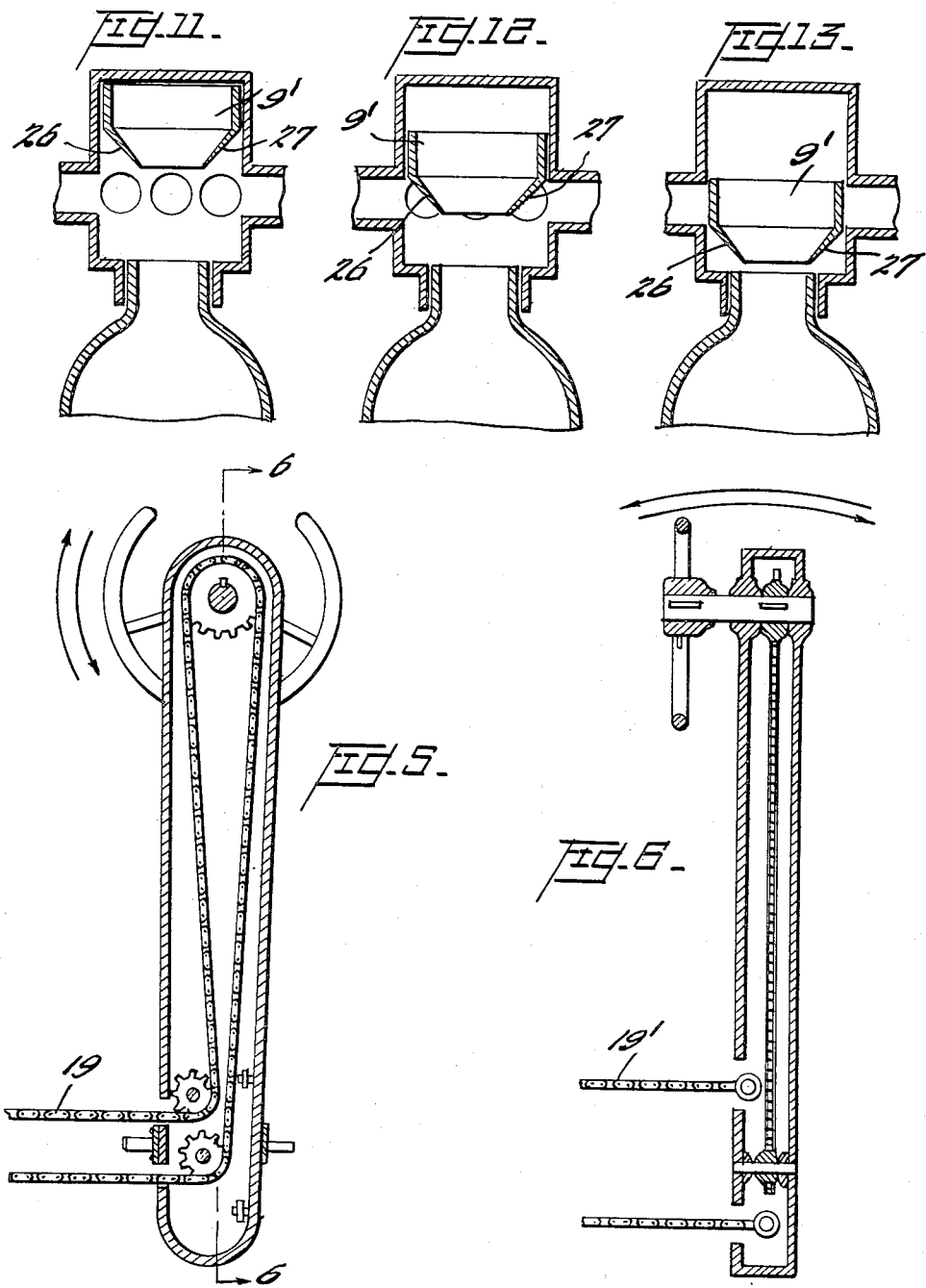

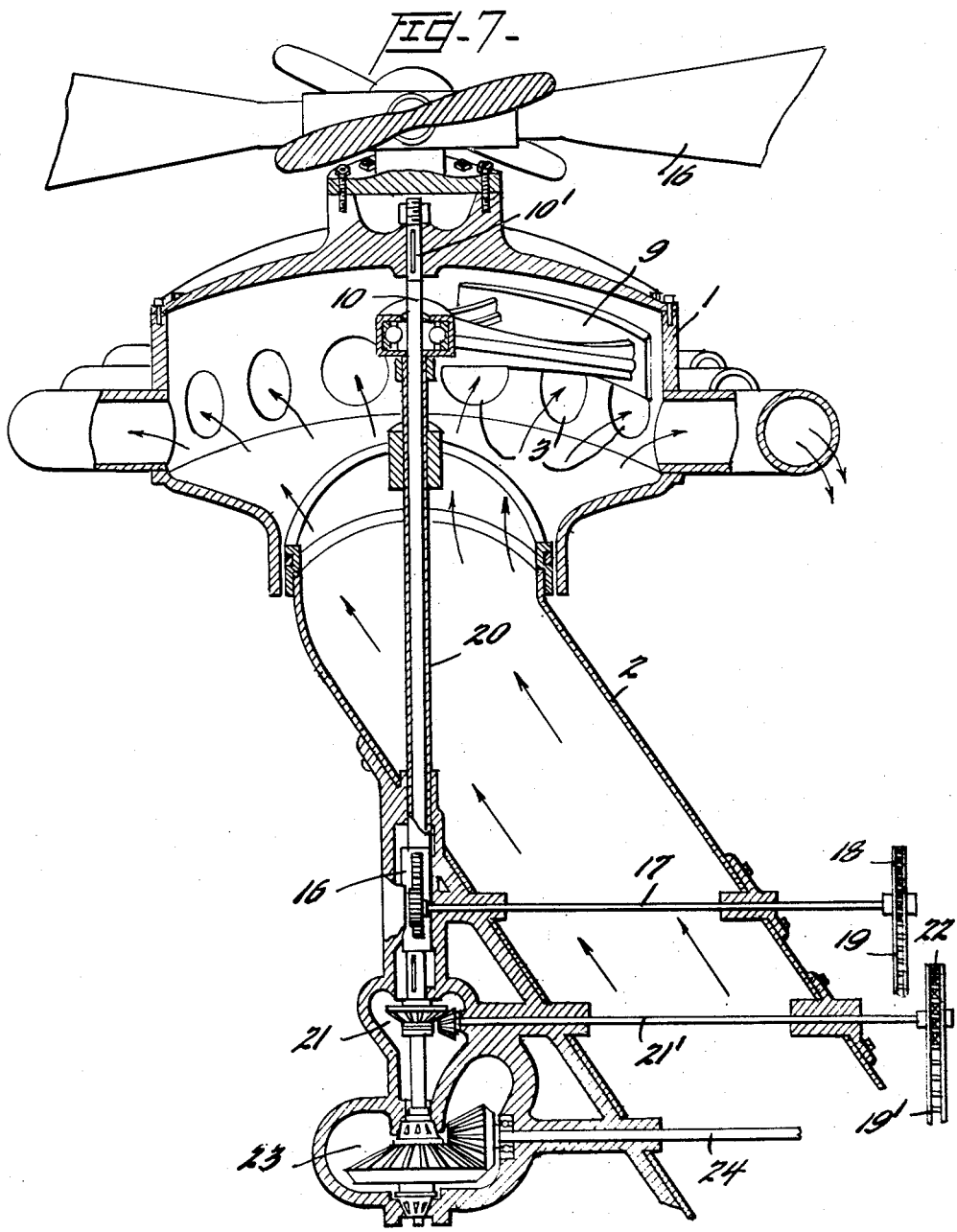

Aug. 17, 1954     A. DA SILVA COSTA     2,686,567
JET CONTROLLER FOR REACTION-DRIVEN HELICOPTER ROTORS
Filed Aug. 9, 1951     4 Sheets-Sheet 4
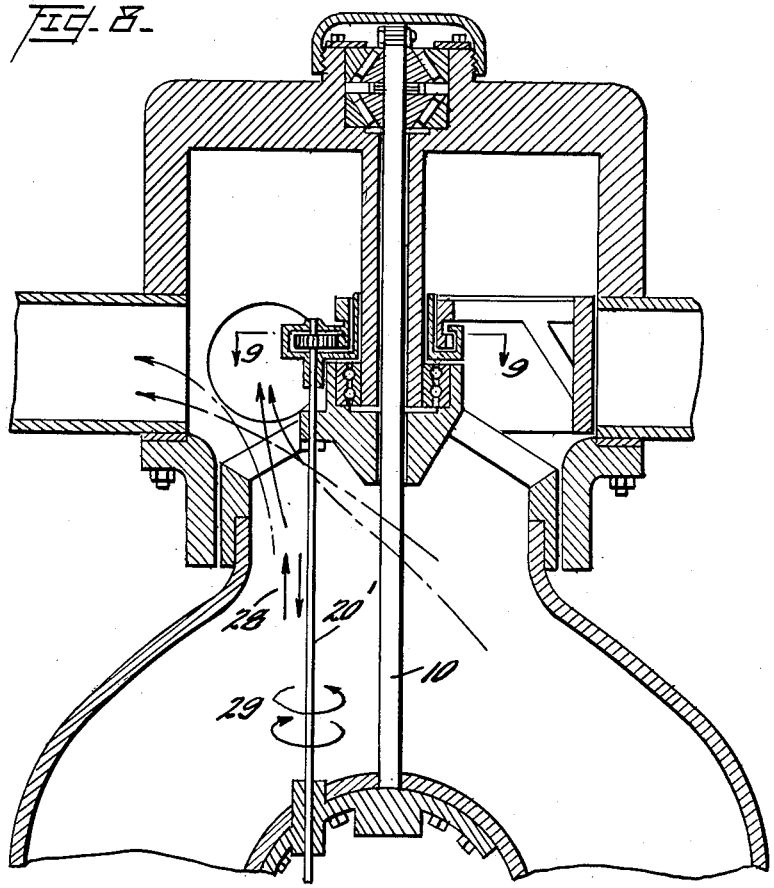
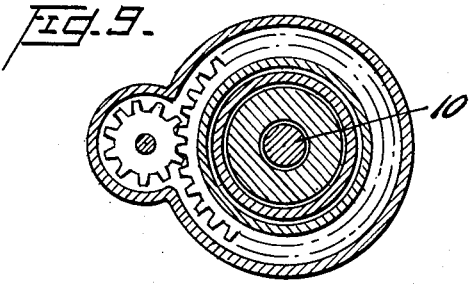
INVENTOR.
BY *Alvaro da Silva Costa*
*Watson, Cole, Grindle & Watson*
ATTORNEYS Patented Aug. 17, 1954

2,686,567

UNITED STATES PATENT OFFICE 2,686,567

JET CONTROLLER FOR REACTION-DRIVEN HELICOPTER ROTORS

Alvaro da Silva Costa, Rio de Janeiro, Brazil

Application August 9, 1951, Serial No. 241,019

Claims priority, application Brazil May 29, 1951

6 Claims. (Cl. 170—135.4)

This invention relates to jet reaction propulsion devices, and more particularly to methods and apparatus for adapting this type of propulsion device to aircraft.

The application of this invention to aircraft contemplates aircraft with a rotatable wing or blade assembly in which the rotation of the assembly is effected by reaction jets and is particularly well adapted to helicopters, which have at least one blade assembly rotating in a horizontal plane above the helicopter fuselage. This blade assembly is rotated by providing a series of jet nozzles as a part of the assembly and about its axis of rotation and in a plane coincidental with the plane of the blade assembly or in a plane parallel with the blade assembly. These jet nozzles are symmetrically located and are uniformly directed either perpendicularly or obliquely to the radii from the axis of rotation of the assembly. It is apparent that with a symmetrical blade and jet assembly the only propulsion effect will be a vertical lift on the helicopter resulting from the rotation of the blades, assuming that the blade pitch is adjusted to provide a lift.

The present invention provides additional apparatus to control the flow of exhaust gases through the jet nozzles, that is, to permit an equal flow of gases through all jet nozzles or to restrict or cut off the flow to certain nozzles, this operation being under the direct control of the pilot. The effect of this limitation of flow through certain nozzles and not others is to provide a propulsion which is the direct result of the reaction jets and is in addition to the vertical lift provided by the rotating blades which is an indirect propulsion effect of the reaction jets. This direct propulsion effect of the reaction jets gives the helicopter a propulsion in a horizontal plane in a direction dependent on which of these jet nozzles have their flow restricted. The combination of the direct propulsion effected by the reaction jets and the indirect propulsion of the reaction jets resulting from the rotating blade assembly affords a resultant propulsion in any direction depending on the relative force and direction of the propulsion forces. This direction of movement of the helicopter is under the control of the pilot who may both control the amount of the exhaust gases flowing through the jet nozzles and, also, control the specific nozzles through which the exhaust gases are to flow. This is therefore a control of direction and speed of flight by control of the propulsion means directly.

It is therefore an object of my invention to provide a reaction jet propulsion system to rotate the rotor of an aircraft.

A further object of my invention is the provision of a reaction jet propulsion system to rotate the rotors of aircraft in which the reaction jets may be utilized to directly propel the aircraft, in addition to the propulsion effected by the rotors.

Another object of my invention is the provision of a reaction jet propulsion system for aircraft in which the pilot has direct control of the direction and speed of flight by controlling the amount of exhaust gases utilized and by selecting the specific reaction jets through which the passage of gas is restricted.

An additional object of my invention is the provision of a reaction jet propulsion system which is useful in aircraft and particularly well suited to helicopters, which is economical to construct and install, which is provided with a minimum number of moving parts, and which is efficient in operation and simple to control.

The various objects and features of the invention will be better understood from the following detailed description when read in conjunction with the accompanying drawings in which Figure 1 is a horizontal sectional view of the apparatus showing the jet nozzles and the jet distributing plate and illustrating diagrammatically the gas flow;

Figs. 2, 3 and 4 are vertical sectional views of the apparatus showing various positions of the jet distributing plate and showing diagrammatically the gas flow;

Figs. 5 and 6 are partial vertical sectional views of the control means;

Fig. 7 is a partial vertical sectional view of a structure embodying the invention;

Fig. 8 is a partial vertical sectional view showing the drive for the gas distributing plate;

Fig. 9 is a sectional view on line 9—9 of Fig. 8;

Fig. 10 is a partial vertical elevation of the structure of Fig. 7; and

Figs. 11, 12 and 13 show, in several vertical sectional views, different positions for the gas distributing plate.

In the following description of the invention, the discussion will be limited to the use of the invention in helicopters, but it is to be understood that the general principles set forth may be applied to other types of aircraft or may be used with other types of apparatus utilizing propulsion devices.

In the propulsion of helicopters it is necessary to provide both a lifting force and a force tending to move the helicopter horizontally over the earth's surface. The lifting force is provided by the rotor comprising a series of blades radiating from a vertical shaft. According to the present invention, these blades are rotated by means of a series of jets made a part of the rotor assembly so that the resultant force of the reaction jets will be a force tending to rotate the rotor assembly.

In order to obtain a component of motion horizontal to the earth's surface it has been necessary to tilt the rotor on an angle, or by placing another rotor in a vertical plane to pull the aircraft in a horizontal direction or by some other means which is in addition to the apparatus for effecting the vertical lift. By means of the present invention the helicopter is permitted to fly on a level course in any direction with the entire propulsion effect resulting from the rotor and jet assembly.

These jets, as pointed out, cause a rotation of the rotor and by utilizing a jet distributing plate reaction gas flow may be restricted through certain of the jet nozzles. In cutting off the gas flow from certain of the jet nozzles an unsymmetrical situation is created in which gas flow is permitted in nozzles on one side of the rotor and restricted from flowing through the nozzles on the other side of the rotor. This will give a resultant force having a component directed towards the side of the rotor with the restricted gas flow. If the gas flow is restricted in the nozzles in the fore part of the helicopter, the gas flowing through the rear nozzles will give a resultant force having a component to cause the helicopter to move forwardly as well as rotate the blades to provide a lift. Even though the nozzles rotate with the rotor the jet distributing plate does not so that the desired forward motion may be maintained. The jet distributing plate may be shifted about the axis of rotation by the pilot to cut off any of the reaction jets to obtain movement of the helicopter in other directions than forward, that is to the side or rearwardly.

More specifically describing the invention with reference to the drawings, a very simple illustration of the principle of operation of the invention utilizing the reaction jet nozzles and the jet distributing plate is shown in Figures 1 to 4. A cylindrical body or gas distributing box 1 having an internal chamber rotates on a vertical axis about a tube 2, which conducts the reaction gases from the motor through the chamber to the orifices 3 on the body. These orifices are arranged about the periphery of the body 1 in symmetrical order and are followed through by tubes 4 terminating in a direction which may be perpendicular or oblique to the radii 6 of the circle 7 formed by the walls of the chamber. A gas distributing or jet obturating plate 9 is located within the chamber. This plate is attached to axle 10 within tube 2 by arms 11 and, as shown, the plate may be rotated about its axle or reciprocated in a vertical direction independent of the rotation of the rotor body 1. This semicircular plate extends partially around the main circumference of the chamber walls to block certain of the orifices.

As is diagrammatically illustrated the reaction gases pass from the motor, through the tube 2, through the chamber to the orifices and tubes 4, and are ejected as jets 5. These jets effect a rotation of the body 1 about its axis in the direction 8. With the plate positioned to block off the jets on the left hand side of Figs. 1 and 2 the flow of gas only occurs through those orifices in the right hand portions in the figures since as the body rotates the plate remains stationary to block the orifices brought behind the plates as others are unblocked. This partial flow of gas results in horizontal displacement of the system in a direction opposite to the direction of the jets coming from the orifices which are open, in addition to the rotary motion of the system in the direction of arrow 8.

The plate 9 may be rotated about its axle as indicated by arrows 14 in Figure 3 by a mechanism (not shown) connected to gear 15 on axle 10. In this view the plate has been rotated to the position opposite to that previously shown to block several of those orifices originally unblocked and to effect a movement of the system in the opposite direction in addition to the rotary movement as shown by arrow 8.

The plate may also be moved vertically as shown in Figure 4 by operating controlling mechanism represented by 16 to completely unblock all of the orifices. This results in completely balancing the forces operating to move the system in a horizontal direction and results only in the rotary movement as indicated by arrow 8.

A working embodiment of the apparatus of the invention is shown in Figures 5 to 13.

Referring to Figure 7, the rotor blades 16 are attached like the spokes of a wheel, which is the common structure of helicopter rotors, with the blade unit rigidly attached to the top of the jet distributor box 1. The distributor box 1 receives the gas under pressure from the jet motor through pipe 2 extending obliquely from the helicopter fuselage and ending in a joint about which the rotor unit rotates. The jet distributor plate 9 serves to block the orifices 3 constituting the internal openings of tubes 4 extending outwardly from the box and ending in curves, which must be perpendicular or oblique to the radii formed by box 1 from axle 10 already mentioned in the discussion of Figure 1.

Rotor axle 10 fixed to the upper part of the box at 10' and extends through axle 20 of the distributor plate into the distributor plate control mechanism which is divided into two parts and is located external to the tube 2. The first part of the control mechanism is a distributor plate raising and lowering mechanism which comprises the rack and pinion 16 connected to gear 18 by axle 17 and controlled by the pilot's control (Figs. 5 and 6) through chain 19. The second mentioned mechanism comprises the gearing 21 driven by axle 21' which is driven by gear 22 which in turn receives its rotation from the pilot's control through a chain 19'. The pilot may control the upward, downward or rotary movement of the distributing plate with his single control and thereby control the direction of movement of the helicopter.

On the lower extremity of rotor axle 10 is attached gearing 23 which may be connected by axle 24 to another rotor, if the helicopter possesses such, to permit the two rotors to work in synchronization. The pitch of the rotor blades may be variable, if such is desired, by providing the apparatus commonly used with airplane propellers of variable pitch.

As seen in Figure 8, the distributor plate control mechanism axle 20' may be separated from the rotor axle 10 and provided with an external control gearing 1 to rotate the plate 2. The arrows 28 and 29 indicate the motions of the axle 3 to raise and lower or rotate the jet distributor plate 2.

Figure 10 illustrates structure similar to that of Figure 7 but more solid in construction. The rotor blade unit 25 is attached directly to the top of the jet distributing box 1.

In Figures 11–13 the lower edge of the plate 9' is cut off at the lower corners 26 and 27 to form a definite angle with the lower and upper edges. This structure allows the jet-distributing plate to block certain orifices more than others within the area covered by the plate, when partially lowered as illustrated in Figure 12. In Figure 13 the plate 9' is completely lowered to cover all of the orifices within the area of the plate.

Jet motors possess very great horsepower per unit of weight particularly when compared with the internal combustion engine and are considerably simpler in design. When the jet motor of this invention is adapted to helicopters, many advantages over the conventional helicopters are acquired. The new craft becomes exceedingly maneuverable, its direction of movement may be easily and rapidly changed and it may be accelerated and decelerated very rapidly. It will transport greater loads at greater speeds and may ascend very rapidly to high altitudes unattainable by conventional machines. Further advantages result from locating the motors in the center of gravity of the helicopter, and from the fact that the motors are practically devoid of noise and vibration. The problem of "torque" which plagues aircraft using the ordinary rotors, is avoided by the use of the motor of this invention, and, therefore, the use of auxiliary compensating rotors or other compensating devices may be avoided. It is, therefore, seen that the use of the motor of this invention results in aircraft which are superior in many respects to conventional aircraft and possess many advantages and desirable features.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Having thus described the invention, what is claimed as new and desired to be secured by Letters Patent is:

1. Jet propulsion rotor device comprising a radial series of blades mounted for rotation about a generally vertical axis, separate gas distributing means operatively connected to said blades for rotation therewith and including a central chamber having a plurality of angularly spaced outlet orifices, conduit means for conducting gas under pressure to said chamber, and means for selectively obstructing a part of said outlet orifices, said outlet orifices being arranged in a circular series in a plane parallel to said series of blades, and said last means including a member movable angularly about said axis to obstruct a selected portion of said series of outlet orifices.

2. Device according to claim 1, said chamber being cylindrical and said last means comprising a parti-cylindrical member movably mounted within said chamber, and means for moving said member relative to said orifices.

3. Device according to claim 1, including a flight control organ, and means operatively connecting said flight control organ to said movable obstruction member for movement to vary the location thereof with respect to said outlet orifices.

4. Jet propulsion rotor device comprising a radial series of blades mounted for rotation about a generally vertical axis, separate gas distributing means operatively connected to said blades for rotation therewith and including a central chamber having a plurality of angularly spaced outlet orifices, means associated with each said orifice for directing the gas issuing therefrom in a direction making an angle with the radius extending from said axis to the inner end of said orifice, and means for selectively obstructing a part of said outlet orifices, said outlet orifices being arranged in a circular series in a plane parallel to said series of blades, and said last means including a member movable angularly about said axis to obstruct a selected portion of said series of outlet orifices.

5. Device according to claim 4, said chamber being cylindrical and said last means comprising a parti-cylindrical member movably mounted within said chamber, and means for moving said member relative to said orifices.

6. Device according to claim 4, said means associated with each said orifice comprising tubes extending from the outer ends of said orifices and curving in a plane parallel to the plane of said series of blades.

References Cited in the file of this patent

UNITED STATES PATENTS

| Number | Name | Date |
| --- | --- | --- |
| 1,420,619 | Barton | June 27, 1922 |
| 2,396,130 | Sbrilli | Mar. 5, 1946 |
| 2,446,785 | Quick | Aug. 10, 1948 |
| 2,457,936 | Stalker | Jan. 4, 1949 |

FOREIGN PATENTS

| Number | Country | Date |
| --- | --- | --- |
| 22,309 | Great Britain | of 1897 |
| 57,999 | Denmark | Sept. 16, 1940 |
| 427,217 | France | May 22, 1911 |
| 931,296 | France | Oct. 6, 1947 |